(12) United States Patent
Sato

(10) Patent No.: US 6,303,729 B1
(45) Date of Patent: Oct. 16, 2001

(54) PROCESS FOR PREPARING PARTIALLY ADDED CYCLIC ORGANOHYDROGENSILOXANE

(75) Inventor: Shinichi Sato, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/572,966

(22) Filed: May 18, 2000

(30) Foreign Application Priority Data

May 19, 1999 (JP) .................................................. 11-138774

(51) Int. Cl.⁷ ............................ C08G 77/34; C08G 77/12
(52) U.S. Cl. .................. 528/25; 528/15; 528/31; 528/37; 556/451
(58) Field of Search .................. 523/31, 37, 25, 523/15, 38; 556/451

(56) References Cited

U.S. PATENT DOCUMENTS

| | | | |
|---|---|---|---|
| 3,992,427 | * | 11/1976 | Chandra et al. . |
| 4,736,049 | * | 4/1988 | Suzuki et al. . |
| 4,892,918 | * | 1/1990 | Ryang . |
| 5,227,448 | * | 7/1993 | Durfee . |
| 5,409,995 | * | 4/1995 | Iwahara et al. . |
| 6,087,523 | * | 7/2000 | Bank et al. . |

* cited by examiner

Primary Examiner—Robert Dawson
Assistant Examiner—Marc S. Zimmer
(74) Attorney, Agent, or Firm—Millen, White, Zelano & Branigan, PC

(57) ABSTRACT

A partially added cyclic organohydrogensiloxane is prepared in high yields by mixing (A) a cyclic organohydrogensiloxane having at least two Si—H bonds with (B) a cyclic or acyclic organic unsaturated compound having an aliphatic unsaturated double bond, effecting addition reaction in the presence of a platinum catalyst, adding a silylating agent to the reaction mixture, and isolating the product from the reaction mixture by distillation.

20 Claims, 1 Drawing Sheet

PROCESS FOR PREPARING PARTIALLY ADDED CYCLIC ORGANOHYDROGENSILOXANE

This invention relates to a process for preparing a partially added cyclic organohydrogensiloxane which is useful as a crosslinking agent in addition cure type silicone compositions.

BACKGROUND OF THE INVENTION

In the prior art, a partially added cyclic organohydrogensiloxane is prepared by partially adding a compound having an aliphatic unsaturated hydrocarbon group to a cyclic organohydrogensiloxane in the presence of a catalyst such as a platinum compound. In this process, the addition reaction product is isolated by distillation, often in low yields.

More particularly, a partially added cyclic organohydrogensiloxane is prepared by partially adding a compound having an aliphatic unsaturated hydrocarbon group of the general formula (4) to a cyclic organohydrogensiloxane of the general formula (3) in the presence of a platinum compound catalyst according to the following reaction scheme.

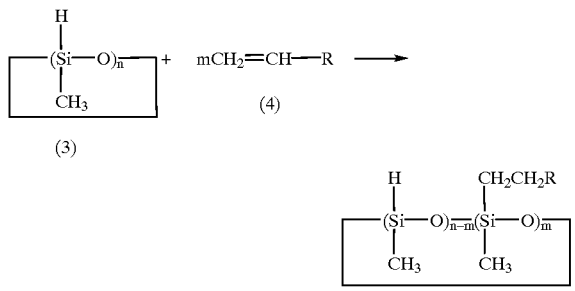

Herein, R is a monovalent hydrocarbon group, n is 3 to 5, and m is 1 to 2. This process, however, suffers from the phenomenon that when the reaction mixture is heated for isolating the reaction product by distillation, ring-opening reaction occurs on both the reactant and the product whereby the isolation yield of the end product becomes very low.

The ring-opening reaction upon heating takes place through the following mechanism. The platinum compound added as the addition reaction catalyst catalyzes ring-opening reaction with a minor amount of water in the system to form silanol compounds, which trigger ring opening of the cyclic organohydrogensiloxane (reactant) and the partial addition compound (reaction product).

To restrain the ring-opening reaction, JP-B 51-33540 proposes to control the catalytic activity of a platinum compound by adding a nitrogen, phosphorus or sulfur-containing compound which becomes a catalyst poison.

The inventor found that even after the catalytic activity is lost, some molecules can exceed the activation energy barrier during heating. As isolation by heat distillation is continued for a long time, ring-opening reaction slowly takes place. Because of this phenomenon, the method is unsatisfactory.

Therefore, for the preparation of a partially added cyclic organohydrogensiloxane, it has been desired to have a technique capable of improving the yield of distillative isolation.

SUMMARY OF THE INVENTION

An object of the invention is to provide a process for preparing a partially added cyclic organohydrogensiloxane so that the end product may be obtained in high yields after distillative isolation.

A partially added cyclic organohydrogensiloxane is prepared by mixing (A) a cyclic organohydrogensiloxane having at least two Si—H bonds in a molecule with (B) a cyclic or acyclic organic unsaturated compound having an aliphatic unsaturated double bond in a molecule such that the moles of Si—H bonds in component (A) may be excessive relative to the moles of aliphatic unsaturated double bonds in component (B), effecting addition reaction in the presence of a platinum catalyst, and isolating the reaction product by distillation. The inventor has found that if a silylating agent is added to the reaction system at the end of addition reactions, but prior to the distillative isolation, the silanol compounds, which are present in the reactions system at the end of addition reaction and can trigger ring-opening reaction undergo silylation reaction with the silylating agent whereby the silanol compounds are converted into siloxane compounds. This effectively prevents ring-opening reaction from taking place on the residual reactant and reaction product and thus significantly improves the yield during distillative isolation. Therefore, the end partially added cyclic organohydrogensiloxane is obtained in high yields.

Accordingly, the invention provides a process for preparing a partially added cyclic organohydrogensiloxane, comprising the steps of:

mixing (A) a cyclic organohydrogensiloxane having at least two Si—H bonds in a molecule with (B) a cyclic or acyclic organic unsaturated compound having an aliphatic unsaturated double bond in a molecule such that the moles of Si—H bonds in component (A) may be excessive relative to the moles of aliphatic unsaturated double bonds in component (B), effecting addition reaction between components (A) and (B) in the presence of a platinum catalyst to form a partially added cyclic organohydrogensiloxane, adding a silylating agent to the reaction mixture, and isolating the partially added cyclic organohydrogensiloxane from the reaction mixture by distillation.

BRIEF DESCRIPTION OF THE DRAWING

The only FIGURE.

DESCRIPTION OF THE PREFERRED EMBODIMENT

Figure 1:
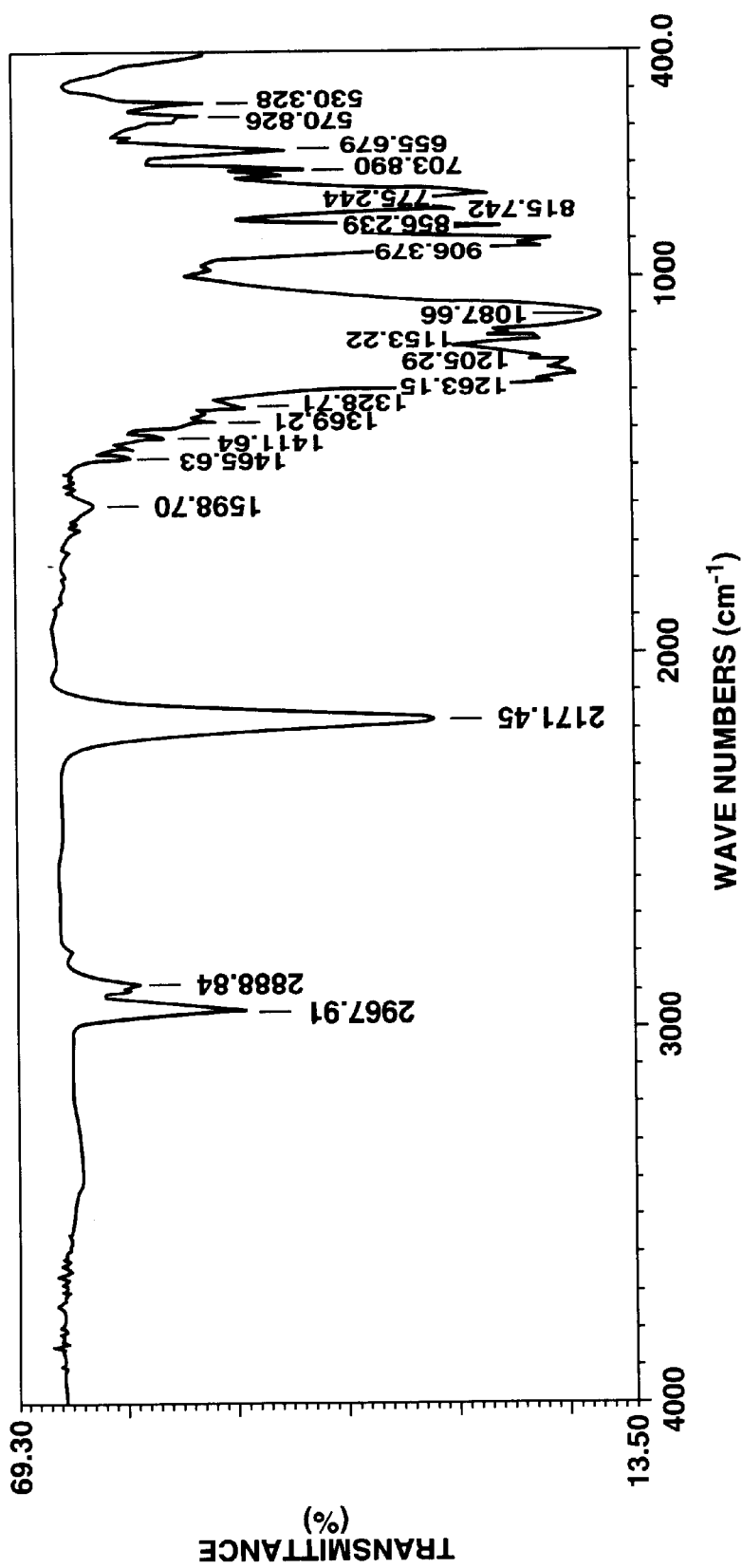
FIG. 1 is an IR spectrum diagram of the partially added cyclic organohydrogensiloxane produced in Example.

The process for preparing a partially added cyclic organohydrogensiloxane according to the invention starts with (A) a cyclic organohydrogensiloxane and (B) an organic unsaturated compound. The cyclic organohydrogensiloxane (A) is not critical as long as it has at least two Si—H bonds in a molecule. Preferably it Is represented by the following general formula (1).

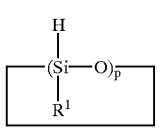

In formula (1), $R^1$ is a substituted or unsubstituted monovalent hydrocarbon group of 1 to 8 carbon atoms. Examples include alkyl groups such as methyl, ethyl and propyl, cycloalkyl groups such as cyclopentyl and cyclohexyl, aryl groups such as phenyl, aralkyl groups such as benzyl, and substituted ones of these groups in which some or all of the hydrogen atoms are replaced by halogen atoms and cyano groups. The letter p is an integer of 2 to 8, and especially 3 to 5.

The organic unsaturated compound (B) may be either cyclic or acyclic as long as it has an aliphatic unsaturated double bond in a molecule. Various substituted or unsubstituted aliphatic unsaturated compounds are useful. One typical class includes fluorinated allyl compounds of the following general formula (2):

$$C_aF_{2a+}-(CH_2)_qCH=CH_2 \quad (2)$$

wherein "a" is an integer of 1 to 20, especially 1 to 12, and q is an integer of 0 to 6.

In the first step of the inventive process, the cyclic organohydrogensiloxane (A) and the organic unsaturated compound (B) are mixed and reacted in the presence of a well-known platinum catalyst. For the purpose of producing a partially added cyclic organohydrogensiloxane having Si—H bonds left behind, components (A) and (B) are mixed such that the moles of Si—H bonds In component (A) may be excessive relative to the moles of aliphatic unsaturated double bonds in component (B). Preferably the molar amount of Si—H bonds in component (A) is 1.1 to 5.0 times, more preferably 1.1 to 3.0 times larger than the molar amount of aliphatic unsaturated double bonds in component (B). Of course, even if the moles of aliphatic unsaturated double bonds is equal to or higher than the moles of Si—H bonds, it is possible to leave Si—H bonds behind by suppressing the reaction rate low. However, such conditions are industrially unacceptable because of difficulty to control the reaction, diversification of by-products, and economic disadvantage.

The platinum catalyst may be selected from well-known catalysts, for example, chloroplatinic acid, alcohol-modified chloroplatinic acid, complexes of chloroplatinic acid with olefins, platinum black, and solid platinum on such carriers as alumina and silica. Chloroplatinic acid or complexes thereof with olefins are preferably dissolved in alcohol, ketone, ether or hydrocarbon solvents prior to use. Also prior to use, the solid catalysts are ground for improved dispersibility. The catalysts on carriers should desirably have a larger specific surface area.

The amount of the platinum catalyst used is preferably in the range of $10^{-7}$ to $10^{-3}$ mol per mol of the aliphatic unsaturated double bonds in the organic unsaturated compound (B).

When the addition reaction is carried out, a suitable inert solvent such as hexane, heptane, benzene, toluene, xylene, ethyl ether or propyl ether may be used in a suitable amount as the reaction medium.

Addition reaction conditions may be suitably determined although reaction is preferably carried out at a relatively low temperature of lower than about 150° C., more preferably lower than about 110° C. for about 2 to 8 hours.

Where the organic unsaturated compound (B) itself is readily polymerizable, a polymerization inhibitor such as 2,6-di-t-butyl-4-methylphenol may be added to the reaction system in order that addition reaction take place. The amount of the polymerization inhibitor added may be conventional insofar as the objects of the invention are not impaired.

According to the invention, the addition reaction effected in the above-described way is followed by the addition of a silylating agent and distillative isolation. The silylating agent is added to the reaction system prior to the isolation of the reaction product by distillation. The silylating agent reacts with the silanol compounds existing in the reaction system at the end of addition reaction to convert the silanol compounds into siloxane compounds. This effectively prevents the residual reactant and the reaction product from undergoing ring-opening reaction upon heating for distillative isolation, enabling to collect the end product in high yields.

The silylating agent used herein may be selected from those commonly used in silylating reaction. Exemplary silylating agents are illustrated by the following molecular formulae.

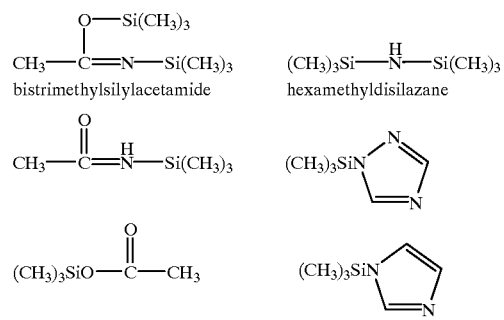

Of these, bistrimethylsilylacetamide and hexamethyldisilazane are especially preferred.

The amount of the silylating agent added is preferably in excess of the moles of the silanol produced during partial addition reaction. In this regard, the amount of silanol remaining in the reaction system at the end of addition reaction is measured, and the silylating agent is used in an amount of 2 to 10 mol, more preferably 2 to 5 mol per mol of the silanol. A too less amount of the silylating agent may fail to achieve the additive effect. An excessive amount of the silylating agent is uneconomical and may impose a need to separate the silylating agent in the distillation step.

In one preferred procedure, the reaction system resulting from the addition reaction step is cooled to nearly room temperature before the silylating agent is added. After the addition of the silylating agent, silylating reaction is effected, for example, by agitating at about 20 to 60° C. for about 1 to 8 hours.

At the end of silylating reaction, the reaction product is isolated from the reaction system by distillation. The distillative isolation may be carried out by prior art well-known means, for example, conventional vacuum distillation. No particular limits are imposed on the distillation step. By such ordinary distillation, the end product, partially added cyclic organohydrogensiloxane can be isolated without giving rise to an undesirable problem such as gelation.

The partially added cyclic organohydrogensiloxane thus isolated is useful as a crosslinking agent for addition cure type silicone compositions. If residual Si—H bonds are converted into silanol bonds by hydrolysis under moderate conditions in the presence of alkali, the resulting organohydrogensiloxane is also useful as a crosslinking agent for condensation cure type silicone compositions.

There has been described a process for preparing a partially added cyclic organohydrogensiloxane through distillative isolation in high yields.

EXAMPLES

Examples of the invention are given below by way of illustration and not by way of limitation.

Example A 10-liter four-necked flask equipped with a stirrer, thermometer, reflux condenser and dropping funnel was charged with 4,000 g of 1,3,5,7-tetramethylcyclotetrasiloxane, 1,600 g of toluene, and 0.4 g of a toluene solution of platinum-ethylene complex (containing about 0.5% of Pt). The reaction mixture was heated at 80° C. To the reaction mixture, 3,072 g of a fluorinated allyl compound ($C_8F_{17}CH_2CH=CH_2$) was added dropwise over 2 hours.

After the completion of addition, the reaction system was ripened for 8 hours at 80° C., then cooled to room temperature. At this point, the amount of silanol remaining in the reaction system was measured to be 0.05 mol. Then 50 g of bistrimethylsilylacetamide, whose molar amount was 5 times the molar amount of residual silanol, was added to the reaction system, which was stirred at room temperature for one hour. Using a rotary evaporator, the toluene and the excess of 1,3,5,7-tetramethylcyclotetrasiloxane were distilled off. The residue was subjected to simple distillation, collecting 3,403 g of a fraction having a boiling point of 107–109° C./2 mmHg and a refractive index of 1.353 at 25° C. (yield 72.8%).

On analysis by proton-NMR and IR spectroscopy, the fraction was identified to be a partially added cyclic organohydrogensiloxane of the following formula.

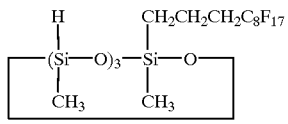

1H-NMR
δ 0.32 (s, Si—CH$_3$, 12H)
δ 4.79 (s, Si—H, 3H)
IR (FIG. 1)
ν Si—H: 2170 cm$^{-1}$

Comparative Example

Synthesis was carried out as in Example except that the bistrimethylsilylacetamide was omitted. The fraction collected by simple distillation was 810 g (yield 17.3%). At the end of simple distillation, 5,700 g of a gel-like material was left in the flask.

It is seen from the foregoing Example and Comparative Example that by the addition of bistrimethylsilylacetamide prior to simple distillation, the yield of the product isolated by distillation is significantly improved.

Japanese Patent Application No. 11-138774 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A process for preparing a partially added cyclic organohydrogensiloxane, comprising the steps of:
   mixing (A) a cyclic organohydrogensiloxane having at least two Si—H bonds in a molecule with (B) a cyclic or acyclic organic unsaturated compound having an aliphatic unsaturated double bond in a molecule such that the moles of S—H bonds in component (A) may be excessive relative to the moles of aliphatic unsaturated double bonds in component (B),
   effecting addition reaction between components (A) and (B) in the presence of a platinum catalyst to form a partially added cyclic organohydrogensiloxane,
   adding a silylating agent to the reaction mixture, and
   isolating the partially added cyclic organohydrogensiloxane from the reaction mixture by distillation.

2. The process of claim 1 wherein the silylating agent is selected from bistrimethylsilylacetamide and hexamethyldisilazane.

3. A process according to claim 1, wherein the silylating agent is selected from the following formulae:

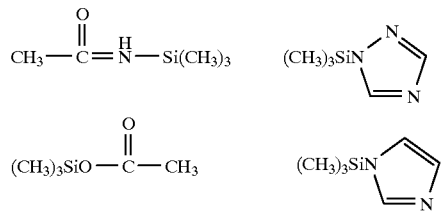

4. A process according to claim 1, wherein the silylating agent is added to the reaction mixture at the end of addition reaction, but prior to the distillative isolation.

5. A process according to claim 4, wherein the silylating agent is added to the mixture after the mixture is cooled to about room temperature.

6. A process according to claim 4, wherein the mixture, after the addition of the silylating agent, is agitated to about 20 about 60°C for about 1 to 8 hours.

7. A process according to claim 1, wherein silanol compounds are present at the end of the addition reaction.

8. A process according to claim 7, wherein the silanol compounds are converted to siloxane compounds.

9. A process according to claim 7, wherein the amount of the silylating agent added is in excess of the moles of the silonal produced during the partial addition reaction.

10. A process according to claim 9, wherein the silylating agent is added in an amount of 2 to 10 per mol of the silanol produced.

11. A process according to claim 9, wherein the silylating agent is added in an amount of 2 to 5 per mol of the silanol produced.

12. A process according to claim 1, wherein the cyclicorganohydrogensiloxane (A) is a molecule of the following formula:

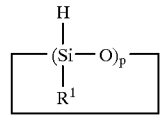

wherein R$^1$ is a mono to per-halo substituted, cyano substituted or unsubstituted monovalent hydrocarbon group of 1 to 8 carbon atoms, p is an integer of 2 to 8.

13. A process according to claim 1, wherein the organic unsaturated compounds (B) is a substituted or unsubstituted aliphatic unsaturated compound.

14. A process according to claim 1, wherein the organic unsaturated compound (B) is a fluorinated allyl compound of the following formula:

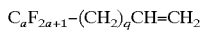

wherein a is an integer of 1 to 20, and q is an integer of 0 6.

15. A process according to claim 14, wherein a is an integer of 1 to 12.

16. A process according to claim 1, wherein the molar amount of Si-H bonds in component (A) is 101 to 5.0 times larger than the molar amount of aliphatic unsaturated double bonds in component (B).

17. A process according to claim 1, wherein the molar amount og Si-H bonds in component (A) is 1.1 to about 3.0 times larger than the molar amount of aliphatic unsaturated double bonds in component (B).

18. A process according to claim 1, wherein the platinum catalyst is selected from chloroplatinic acid, alcohol-modified chloroplatinic acid, complexes of chloroplatinic acid with olefins, platinum black, and solid platinum on a carrier.

19. A process according to claim 1, wherein the temperature during the addition reaction between components (A) and (B) is less than 150°C.

20. A process according to claim 19, wherein the time for the temperature to be less than 150°C is about 2 to 8 hours.

* * * * *